United States Patent
Rhoads et al.

(10) Patent No.: US 10,340,763 B2
(45) Date of Patent: Jul. 2, 2019

(54) ISOLATION RING FOR ELECTRIC MOTOR END WINDINGS

(71) Applicant: GM Global Technology Operations LLC, Detroit, MI (US)

(72) Inventors: Frederick W. Rhoads, Holly, MI (US); Rodney C. Malone, Clarkston, MI (US); John A. Diemer, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 15/653,525

(22) Filed: Jul. 18, 2017

(65) Prior Publication Data
US 2019/0027990 A1     Jan. 24, 2019

(51) Int. Cl.
| H02K 5/12 | (2006.01) |
| H02K 3/38 | (2006.01) |
| H02K 3/487 | (2006.01) |
| H02K 3/52 | (2006.01) |
| H02K 3/34 | (2006.01) |
| H02K 11/00 | (2016.01) |

(52) U.S. Cl.
CPC ........... H02K 3/38 (2013.01); H02K 3/487 (2013.01); H02K 3/522 (2013.01); H02K 3/345 (2013.01); H02K 11/0094 (2013.01)

(58) Field of Classification Search
CPC .......... H02K 3/38; H02K 3/487; H02K 3/522; H02K 3/345; H02K 11/0094
USPC ................................................. 310/88
See application file for complete search history.

(56) References Cited

U.S. PATENT DOCUMENTS

| 3,919,572 A | * | 11/1975 | Desy | ....... H02K 1/187 |
| | | | | 310/270 |
| 2010/0231065 A1 | * | 9/2010 | Murata | ....... H02K 3/24 |
| | | | | 310/54 |
| 2017/0302120 A1 | * | 10/2017 | Kobayashi | ....... H02K 3/30 |

* cited by examiner

Primary Examiner — Hanh N Nguyen
(74) Attorney, Agent, or Firm — Harness, Dickey & Pierce, P.L.C.

(57) ABSTRACT

An electric motor for a hybrid or electric vehicle drive unit includes a housing with a stator fixed within the housing and including a plurality of end windings. A rotor is disposed within the housing and connected to a drive shaft. An isolating ring is disposed within the housing between the end windings and the housing.

6 Claims, 1 Drawing Sheet

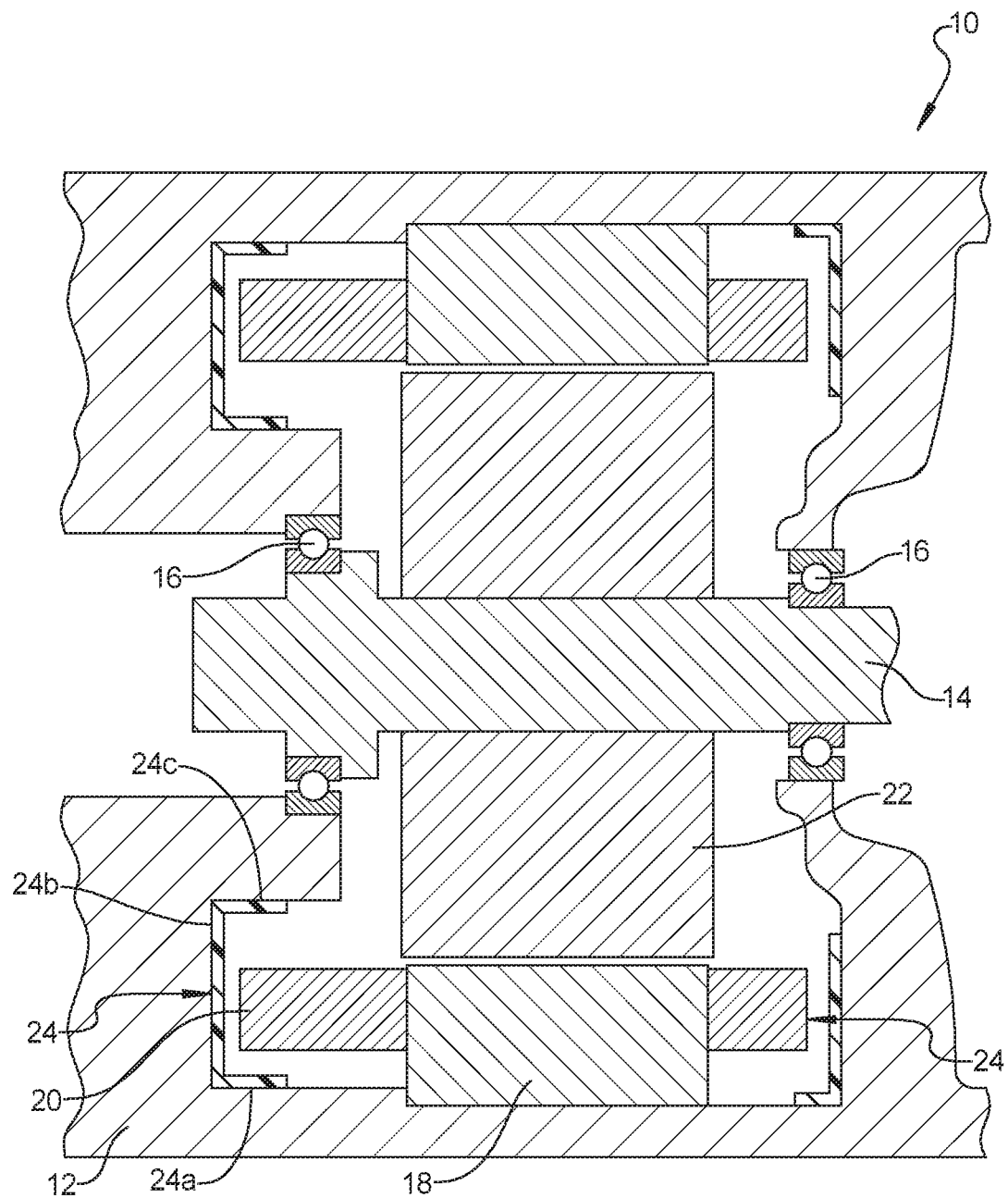

ISOLATION RING FOR ELECTRIC MOTOR END WINDINGS

FIELD

The present disclosure relates to electric motors and more particularly to an isolation ring for electric motor end windings.

BACKGROUND

This section provides background information related to the present disclosure which is not necessarily prior art.

Electric motors are becoming more commonly used in electric vehicle and hybrid vehicle drive units. The electric motors include a stator and a rotor connected to a drive shaft. Lengths of wire, called "conductors", are wound around the stator structure. This winding process usually causes the windings and internal motor leads to be bent into relatively narrow radius curves defining end windings. The rotor and stator are disposed within a housing. Electric motor design requirements require a minimum spacing between the end windings and the housing without an insulation system on one of the adjacent parts. A reduced spacing is used for applications where one of the adjacent parts has high dielectric insulation qualities. These requirements are designed to prevent risk of short. In previous electric motors, the end windings have been dipped in epoxy to isolate/insulate the end windings. The epoxy dipping was used to comply with the reduced design requirements. However, alternative isolation features are desirable.

SUMMARY

This section provides a general summary of the disclosure, and is not a comprehensive disclosure of its full scope or all of its features.

An electric motor for a vehicle drive unit includes a housing with a stator fixed within the housing and including a plurality of end windings. A rotor is disposed within the housing and connected to a drive shaft. An isolating ring is disposed within the housing between the end windings and the housing, wherein the end windings are spaced from the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The FIGURE shows a schematic cross section of the electric motor having an isolation ring according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the FIGURES. Spatially relative terms may be intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The FIGURE shows an electric motor 10 for use with an electric vehicle or hybrid drive unit. The electric motor 10 includes a housing 12 that supports a rotating drive shaft 14 by bearings 16. A stator 18 is fixedly supported within the housing 12 and includes a plurality of windings 20 that extend from opposite ends of the stator 18. A rotor 22 is mounted to the drive shaft 14. An isolation ring 24 is disposed within the housing 12 between the end windings 20 and the interior surface of the housing 12. The isolation ring 24 can be made from a thin layer of dielectric material that is molded or formed as an insert that is mechanically retained within the housing 12 or alternatively is a sprayed on material that prevents a short to ground for the motor end windings 20. The isolation ring 24 can have a thickness of 1 mm or less and can be made from PTFE, PEEK, FEP or other dielectric material.

The isolation ring 24 can be disposed on one or both ends of the end windings and can take on a form of the interior wall surface of the housing 12. The use of the isolation ring 24 enables an overall reduction in drive unit axial and radial dimensions by up to several millimeters while preventing shorting of the end windings 20. The isolation ring 24 can include an outer wall portion 24a, an end wall portion 24b and an inner wall portion 24c. Retention features can be formed in the isolation ring 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor for a vehicle drive unit, comprising:
   a housing;
   a stator fixed within the housing and including a plurality of end windings;
   a rotor disposed within the housing and connected to a drive shaft;
   an isolating ring made from a dielectric material and having a thickness of 1 mm or less is disposed within the housing between the end windings and the housing and defining an air gap completely between the end windings and the isolating ring, wherein the isolation ring is sprayed on an interior surface of the housing.

2. The electric motor according to claim 1, wherein the isolation ring is made from one of PTFE, PEEK and FEP.

3. An electric motor for a vehicle drive unit, comprising:
   a housing;
   a stator fixed within the housing and including a plurality of end windings;
   a rotor disposed within the housing and connected to a drive shaft;
   an isolating ring made from a dielectric material disposed within the housing between the end windings and the housing and defining an air gap completely between the end windings and the isolating ring, wherein the isolation ring is sprayed on an interior surface of the housing.

4. The electric motor according to claim 3, wherein the isolation ring is made from one of PTFE, PEEK and FEP.

5. An electric motor for a vehicle drive unit, comprising:
   a housing;
   a stator fixed within the housing and including a plurality of end windings;
   a rotor disposed within the housing and connected to a drive shaft;
   an isolating ring having a thickness of 1 mm or less disposed within the housing between the end windings and the housing and defining an air gap completely between the end windings and the isolating ring, wherein the isolation ring is sprayed on an interior surface of the housing.

6. The electric motor according to claim 5, wherein the isolation ring is made from one of PTFE, PEEK and FEP.

* * * * *